United States Patent
Minase

(10) Patent No.: US 6,981,269 B2
(45) Date of Patent: Dec. 27, 2005

(54) RECORDING MEDIUM DRIVING APPARATUS

(75) Inventor: Minoru Minase, Iruma (JP)

(73) Assignee: Teac Co., Ltd., Tokyo (JP)

( * ) Notice: Subject to any disclaimer, the term of this patent is extended or adjusted under 35 U.S.C. 154(b) by 211 days.

(21) Appl. No.: 10/712,244

(22) Filed: Nov. 12, 2003

(65) Prior Publication Data

US 2004/0095855 A1    May 20, 2004

(30) Foreign Application Priority Data

Nov. 19, 2002  (JP) .............................. 2002-334966

(51) Int. Cl.⁷ ............................................. G11B 17/03
(52) U.S. Cl. .................................................. 720/602
(58) Field of Search ............................... 720/601, 602, 720/650, 651; 369/75.11, 75.21, 77.11, 77.21, 369/30.36, 53.35, 47.31; 361/686, 683, 680

(56) References Cited

U.S. PATENT DOCUMENTS

| | | | |
|---|---|---|---|
| 6,151,284 A | * | 11/2000 | Watanabe et al. ........... 720/601 |
| 6,426,873 B1 | | 7/2002 | Minase ........................ 361/686 |
| 6,522,614 B1 | * | 2/2003 | Kim ............................ 720/601 |
| 6,925,647 B1 | * | 8/2005 | Kabasawa ................... 720/601 |
| 2004/0133904 A1 | * | 7/2004 | Minase et al. .............. 720/652 |
| 2004/0163094 A1 | * | 8/2004 | Matsui et al. ............... 720/650 |
| 2004/0261088 A1 | * | 12/2004 | Hsu et al. .................... 720/601 |
| 2005/0036760 A1 | * | 2/2005 | Abe et al. ..................... 386/46 |

FOREIGN PATENT DOCUMENTS

JP        2001-052420        2/2001

* cited by examiner

Primary Examiner—Allen Cao
(74) Attorney, Agent, or Firm—J.C. Patents

(57) ABSTRACT

A recording medium driving apparatus is provided. A signal from the tray position sensor 13 is provided to the connection point E to control a mute signal generator 80a in the driver IC. When the system controller is abnormal, the potential of the connection point E is low according to the signal from the tray position sensor 13, even though the HIGH signal is output on the buses 172, 75. The mute signal from the mute signal generator 80a is output, and the sled motor driver, the spindle motor driver and the solenoid driver for driving the solenoid 28b of the lock mechanism are maintained at the off state. Even though the system controller is abnormal, the sled motor and the lock mechanism of the tray are maintained at the non-driven state.

4 Claims, 6 Drawing Sheets

RECORDING MEDIUM DRIVING APPARATUS

CROSS-REFERENCE TO RELATED APPLICATION

This application claims the priority benefit of Japanese application serial no. 2002-334966, filed on Nov. 19, 2002.

BACKGROUND OF THE INVENTION

1. Field of the Invention

This invention relates in general to a recording medium driving apparatus. More specifically, the present invention relates to an operation control of ejecting a tray that carries a recording medium, etc.

2. Description of the Related Art

Conventionally, the recording medium driving apparatus, for CD-ROM drives, DVD drives, or combo drives, etc., is well known, and is incorporated with a personal computer. The drive for the computer has a tray for receiving a recording medium in a casing. A pick-up or head for recording data to or reproducing data from the recording medium, a spindle motor (SPM) for rotationally driving the recording medium, and a sled motor for moving the pick-up with respect to the recording medium are also arranged in the tray. The tray is supported in the casing so that the tray can be in a state that the tray is inserted into the casing of the computer and in a state that the tray is ejected from the casing. In general, the tray is resilient to an ejection direction by a spring and comprises a lock mechanism for maintaining the tray in an inserted state against the resilient force of the spring. The lock mechanism has a plunger solenoid, for example, and is driven by the plunger solenoid when ejecting the tray. In this manner, the lock mechanism is released and the tray is ejected. The ejection is activated by a user's ejection operation. As a system controller detects the ejection operation, the plunger solenoid is instructed to release the lock mechanism. Further, the spindle motor and the sled motor are also instructed to stop their motion.

On the other hand, as the system controller experience any abnormality, it is preferred that the spindle motor and the sled motor do not keep operating after the eject operation. In addition, if the plunger solenoid is unnecessarily kept operating due to the abnormality of the system controller after the lock mechanism is released, there is a need to avoid the current from flowing in the plunger solenoid to cause a rise in temperature, etc.

Therefore, conventionally, the tray ejection is detected by a switch, and a safety circuit and a protection circuit are arranged, in which according to a signal from the switch, the safety circuit disables the motions of the spindle and the sled motors irrelevant to the instruction from the system controller, and the protection circuit disables the motion of the plunger solenoid irrelevant to the instruction from the system controller.

A CD-ROM drive, also including its entire device configuration, is used as an example to describe the conventional safety circuit and protection circuit.

FIGS. 3 to 5 shows conventional configurations. FIG. 3 is a block diagram showing the entire configuration. FIG. 4 is a plane view showing that a cover of the CD-ROM drive is removed. FIG. 5 is a block diagram equivalent to FIG. 3. The conventional device is mainly described according to FIG. 3. In addition to an eject switch 5, a tray position sensor 13, an eject mechanism 15a, a lock and lock release mechanism 15b, a disc rotation motor (a spindle motor SPM) 18, an optical pick-up 19 and a sled motor 20, etc., the CD-ROM drive 2 further comprises a system controller 31, a disc motor servo circuit 32, a sled motor control circuit 33, an amplification and calculation circuit 34, a reproduction signal processing circuit 35, an interface 36, a focusing servo circuit 37, a tracking servo circuit 38, a light-emitting control circuit 39, a safety circuit 40, a protection circuit 60 and a solenoid control circuit 62, etc.

When data is read from a recording medium disc 41, which consists of a CD-ROM that is detachably put onto a disc engaging shaft 18c of the disc rotation motor 18, a laser beam is emitted to the disc 41 from the optical pick-up 19, and then a reflection beam is detected by the optical pick-up. The optical pick-up 19 comprises a laser diode, a photo detector having a plurality of photo diodes (for example, six photo diodes), a tracking control actuator, and a focusing control actuator, etc. The laser diode emits light under a control of the light emitting control circuit 39. The output of the photo detector (composed of a plurality of photo diodes) of the optical pick-up 19 is transmitted to the amplification and calculation circuit 34. In addition to a plurality of amplifiers, the amplification and calculation circuit 34 further includes a plurality of adder and a plurality of subtractors, and generates a data reproducing signal, a focusing control signal and a tracking control signal by a known method. The reproduction signal obtained from the amplification and calculation circuit 34, which corresponds to light pits (data), is processed by the reproduction signal processing circuit 35. The reproduction signal processing circuit 35 comprises a known waveform shaping circuit (binarization circuit), a PLL circuit and a demodulating circuit, etc., and is used to form read data. Read data is then transmitted to a host device 42 through the interface 36. The host device 42 is a personal computer, etc.

The focusing servo circuit 37 generates a driving signal for the focusing actuator in response to a focusing control signal obtained from the amplification and calculation circuit 34. The focusing actuator causes an object lens of the optical pick-up 19 to displace in a vertical direction with respect to a principle plane of the disc 41, i.e., along an optical axis of the laser beam. Furthermore, in the focusing servo circuit 37, the system controller 31 is connected to the focusing servo circuit 37 in order to perform a switching control for a phase compensation characteristic and an ON/OFF control for the focusing servo.

The tracking servo circuit 38 generates a driving signal for the tracking actuator in response to the tracking control signal obtained from the tracking servo circuit 38. The tracking actuator causes the object lens of the optical pick-up 19 to displace along a surface direction of the disc 41, i.e., in a direction perpendicular to the optical axis of the laser beam. Furthermore, in the tracking servo circuit 38, the system controller 31 is connected to the tracking servo circuit 38 in order to perform a jumping control for the laser beam, a switching control for a phase compensation characteristic and an ON/OFF control for the tracking servo.

The sled motor control circuit 33, for moving the optical pick-up 19 in the radius direction of the disc 41, drives the sled motor 20 in response to seek data on line 43 out of the system controller 31 and a sled control signal provided from the tracking servo circuit 38.

The eject switch 5 comprises an eject button 5a and a contact-point pair 5b, and the eject switch 5 is turned on by operating the eject button 5a to contact with contact-point pair 5b. Because the contact-point pair 5b of the eject switch 5 is connected between the a power terminal 55 and a ground G through a pull-up resistor 54, a low level signal is transmitted to the system controller 31 when the switch 5 is turned on, so as to activate a solenoid control circuit 62.

The system controller 31 comprises a microprocessor, i.e., a CPU (central processing unit) 90. In order to implementing various controls by the system controller 31, the system controller 31 is connected to the host device 42 through a bus 36a, the interface 36 and a bus 36b. In addition, a tray position sensor 13 is connected to an input terminal 71 of the system controller 31 through a resistor 70. The tray position sensor 13 comprises a sensor switch 13c and a pull-up resistor 44, wherein the sensor switch 13c comprises an actuator 13a and a contact-point pair 13b. One of the contact-points pair 13b of the sensor switch 13c is connected to a DC 5V power terminal 45 through the pull-up resistor 44, and the other one of the contact-point pair 13b is connected to the ground G by an electrically conductive body. An output terminal P1 of the sensor 13 is arranged between the resistor 44 and the sensor switch 13c. The output terminal P1 is connected to the input terminal 71 of the system controller 31 through a resistor 70, and a safety circuit 40 and a protection circuit 60 are also connected to the output terminal P1. When a movable portion 4, including a tray 17, is inserted to a container 11 of a fixed portion 3, the sensor switch 13 is turned on, so that a tray-insertion detection signal with a low level "LOW" is obtained at the sensor output terminal P1. In addition, when the tray 17 is ejected, the sensor switch 13 is turned off, and a tray-ejection detection signal with a high level "HIGH" is obtained at the sensor output terminal P1.

Referring to FIG. 5, the system controller 13, including the CPU 90, comprises a disc rotation motor driving and stopping control signal generator 93, an optical pick-up driving and stopping control signal generator 94, a light emitting on/off signal generator 95, a solenoid driving and stopping control signal generator 96, a disc rotation motor speed instruction generator 97 and a seek instruction generator 98.

The disc rotation motor driving and stopping control signal generator 93 is connected to the first and the second input terminals 71, 72, the bus 36a and the output terminal 48 to generate a signal that indicates driving and stopping the disc rotation motor 18, and the signal is transmitted to the output terminal 48. Namely, in a case that the system controller 31 is normal, the disc rotation motor driving and stopping control signal generator 93 sends a motor turning-on control signal (i.e., a motor driving control signal), which is a low level potential equivalent to logic 0, to the output terminal 48 according to a rotation instruction for the disc 41, which is supplied from the interface 36 through the bus 36a, or according to a signal indicating turning on the tray sensor switch 13c, which is provided to the input terminal 72. In addition, a motor turning-off control signal (i.e., a motor stopping control signal), which is a high level potential equivalent to logic 1, is sent to the output terminal 48 according to a rotation stop instruction for the disc 41, which is supplied from the bus 36a, or a signal indicating the operation of the eject switch 5, which is provided to the input terminal 72, or a signal indicating turning off the tray switch 13c, which is provided to the input terminal 71.

The driving and stopping control signal generator 94 for optical pick-up can be called a driving and stopping control signal generator for the sled motor, the focusing actuator and the tracking actuator, and is connected to the two input terminals 71, 72, the bus 36a and the output terminal 49, so as to generate a signal that indicates driving and stopping the sled motor 20, a signal that indicates driving and stopping the focusing servo circuit 37 and a signal that indicates driving and stopping the tracking servo circuit 38. These signals are sent to the output terminal 49. Namely, in a case that the system controller is normal, the optical pick-up driving and stopping control signal generator 94 sends an optical pick-up motor turning-on control signal, which is a low level potential equivalent to logic 0, to the output terminal 49 according to a driving instruction for the sled motor 20, which is supplied from the bus 36a, or a driving instruction for the focusing servo 37, or a driving instruction for the tracking servo circuit 38, or a signal that indicates turning on the tray switch 13c provided to the input terminal 71.

In addition, the optical pick-up driving and stopping control signal generator 94 sends an optical pick-up motor turning-off control signal, which is a high level potential equivalent to logic 1, to the output terminal 49 according to a stop instruction for the sled motor 20, which is supplied from the bus 36a, or a stop instruction for the focusing servo 37, or a stop instruction for the tracking servo circuit 38, or a signal indicating the operation of the eject switch 5, which is provided to the input terminal 72, or a signal that indicates turning off the tray switch 13c provided to the input terminal 71.

The light emitting on/off signal generator 95 is connected to the two input terminals 71, 72, the bus 36a and the output terminal 50, so as to generate a signal that indicates turning on and off of the known laser diode included in the optical pick-up 19 wherein the signal is then transmitted to the output terminal 50. Namely, in a case that the system controller 31 is normal, the light emitting on/off signal generator 95 sends a light-emitting on control signal (i.e., a laser diode driving control signal), which is a low level potential equivalent to logic 0, to the output terminal 50 according to a light emitting instruction supplied from the bus 36a, or a signal that indicates turning on the tray switch 13c provided to the input terminal 71. In addition, the light emitting on/off signal generator 95 sends a light-emitting off control signal (i.e., a laser diode stop control signal), which is a high level potential equivalent to logic 1, to the output terminal 50 according to a light emitting stop instruction supplied from the bus 36a, or a signal indicating the operation of the eject switch 5, which is provided to the input terminal 72, or a signal that indicates turning off the tray switch 13c provided to the input terminal 71.

The solenoid driving and stopping control signal generator 96 is connected to the input terminal 72, the bus 36a and the output terminal 61 to generate a driving control signal for the plunger solenoid device 28, wherein this signal is then transmitted to the output terminal 61. The solenoid driving control signal on the output terminal 61 is transmitted to the solenoid control circuit 62 through the protection circuit 60. Namely, the solenoid driving control signal generator 96 generates the solenoid driving control signal according to an ejection instruction provided from the bus 36a or an operation of turning on the eject switch 5, wherein the solenoid driving control signal is transmitted to the solenoid control circuit 62 through the protection circuit 60.

The disc rotation motor speed instruction generator 97 is connected to the bus 36a and the output line 46, and a speed instruction for the disc rotation motor 18 is transmitted to the disc motor servo circuit 32 through the line 46. The seek instruction generator 98 is connected to bus 36a and the output line 43, and a seek instruction is transmitted to the sled motor control circuit 33 through the line 43.

The output terminals 48, 49, 50 of the system controller 31 are connected through the safety circuit 40 to the disc motor servo circuit 32, the sled motor control circuit 33, the focusing servo circuit 37, the tracking servo circuit 38 and the light emitting control circuit 39.

The plunger solenoid control circuit 62 comprises a PNP type transistor 64, which is used as an electric switch that is connected between a 5V power terminal 63 and the plunger solenoid device 28, and two resistors 65, 66. The emitter of the transistor 64 is connected to the power terminal 63, the collector is connected to the solenoid 28b, and the base is connected to an OR circuit 67 of the protection circuit 60 through the resistor 66. In addition, the resistor 65 is connected between the emitter and the base of the transistor 64. Therefore, when the output voltage of the protection circuit 60 is low level, the transistor 64 is turned on, and then a current is supplied to the solenoid 28b.

One of the input terminals of the OR circuit 67 that constructs the protection circuit 60 is connected to an ejection signal output terminal 61 of the system controller 31, and the other input terminal is connected to a node P1 of the sensor switch 13c and the pull-up resistor 44 for detecting an insertion and ejection of the tray. When the system controller 31 functions normally, a low level eject instruction occurs at the output terminal 61 in response to an operation of turning on the eject switch 5, and the eject instruction is ended by the sensor switch 13c being turned off. However, when the system controller 31 functions abnormally, the output terminal 61 may be maintained at the low level even though the sensor switch 13c is turned off. However, by using the protection circuit 60, even though the output terminal 61 of the system controller 31 is maintained at the low level (LOW) in the abnormal state, the output of the OR circuit 67 reverses to the high level since the other input terminal of the OR circuit 67 will become high level in response to the sensor 13c being turned off, and additionally, the transistor 64 will be reversed to an off state, and then the current of the solenoid 28b is blocked. Therefore, an abnormal temperature rising of the plunger solenoid device 28 can be avoided.

On the other hand, the safety circuit 40 comprises a first, a second and a third NOR gates 51, 52, 53. One input terminal of the first NOR gate 51 is connected to an output terminal 48, and the other input terminal is connected to the node P1 at the upper end (with respect to the drawing) of the sensor switch 13c. An output terminal of the first NOR gate 51 is connected to the disc motor servo circuit 32 through the line 48a. One input terminal of the second NOR gate 52 is connected to an output terminal 49 of the system controller 31, the other input terminal is connected to the node P1, and an output terminal of the second NOR gate 52 is connected to the sled motor servo circuit 33 through the line 49a. One input terminal of the third NOR gate 53 is connected to an output terminal 50 of the system controller 31, the other input terminal is connected to the node P1, and an output terminal of the third NOR gate 53 is connected to the light emitting control circuit 39 through the line 50a.

During the normal operation of the system controller 31, when the eject button 5a is pressed and the eject switch 5 is turned on, or when an eject instruction from the host device 42 occurs, a high level OFF instruction occurs at the output terminals 48, 49, 50 of the system controller 31. In addition, when the disc motor servo circuit 32, the sled motor control circuit 33, the focusing servo circuit 37, the tracking servo circuit 38 and the light emitting control circuit 39 are turned on, a low level ON instruction occurs at the output terminals 48, 49, 50 of the system controller 31. When the system controller 31 functions normally, as the eject operation is activated normally, the output terminals 48, 49, 50 becomes high level before the eject starts. As a result, the output lines 48a, 49a, 50a of the NOR gates 51, 52, 53 becomes low level irrelevant to the state of the sensor switch 13c. Because the disc motor servo circuit 32, the sled motor control circuit 33, the focusing servo circuit 37, the tracking servo circuit 38 and the light emitting control circuit 39 are off when the low level signal appears on the lines 48a, 49a, 50a, and on when the high level signal appears on the lines 48a, 49a, 50a, the disc motor 18, the sled motor 20, the focusing and the tracking actuators of the optical pick-up 19, and the laser diode are turned off before the eject operation is started by the normal eject operation. For ensuring the safety, the system controller 31 provides the eject instruction to the lock and eject device 15 after the above turning off control. In this manner, the disc 41 and the tray 17 are subjected to an eject state. When the disc 41 and the tray 17 are ejected, the user will not be endangered because operations of the disc motor 18, etc. are stopped.

As the movable portion 4 is forced to eject by an emergence eject operation, the sensor switch 13c is turned off, and the voltage at the node P1 is above 5V, i.e., H (high level) when the power source voltage is normal. Therefore, the output lines 48a, 49a, 50a of the output terminals of the NOR gates 51, 52, 53 becomes low level irrelevant to the state of the output terminals 48, 49, 50 of the system controller 31, and the disc motor 18, the sled motor 20, the tracking actuator, the focusing actuator and the laser diode, etc. are turned off. Namely, at the same time of ejection, the disc motor 18, the sled motor 20, the tracking actuator, the focusing actuator and the laser diode, etc. are turned off, so that the safety of the user can be ensured. As described above, the NOR gates 51, 52, 53 of the safety circuit 40 turns off the disc motor 18, the sled motor 20, the tracking actuator, the focusing actuator and the laser diode, etc., irrelevant to the high or low state of the output terminals 48, 49, 50 of the system controller 31. Namely, even though the output terminals 48, 49, 50 cannot be converted from the low state (L) to the high state (H) in response to the operation of turning off the sensor switch 13c due to the malfunction of the system controller 31, the state of the output lines 48a, 49a, 50a of the NOR gates 51, 52, 53 are converted to the L state (low level state), so as to turn off the disc motor 18, the sled motor 20, the tracking actuator, the focusing actuator and the laser diode, etc.

FIG. 6 shows exemplary circuits of the safety circuit 40 and the protection circuit 60. The safety circuit 40 is constructed to include a transistor 40a. The base of the transistor 40a is connected to a connection point (node) P1 of the tray position sensor 13, the emitter is connected to the system controller 31, and the collector is connected to a voltage of 0V through a resistor and also to the sled motor control circuit 33, the disc motor servo circuit 32 and the light emitting control circuit 39. Even though a driving instruction (High) is output at the eject state due to the abnormal state of the system controller 31, the transistor 40a is turned off because the potential at the node P1 of the tray position sensor 13 is high, so that the low level (LOW) signal is output to the sled motor control circuit 33, the disc motor servo circuit 32 and the light emitting control circuit 39, so that the circuits 33, 32, 39 are subjected to a muted state (non-driven state).

The protection circuit 60 is constructed by a transistor 60a and a transistor 60b. The base of the transistor 60a is connected to the connection point P1 of the tray position sensor 13, the emitter is connected to the 0V voltage and the collector is connected to the connection point Q. The base of the transistor 60b is connected to the system controller 31 through the connection point Q, the emitter is connected to the 0V voltage and the collector is connected to the base of the transistor 64 of the solenoid control circuit 62. Even though a signal HIGH is output at the eject state due to the abnormal state of the system controller 31, the potential at the connection point P1 of the tray position sensor 13 becomes high, the transistor 60*a* is turned on and the potential of its collector becomes low. Therefore, the potential at the connection point Q becomes low. As a result, regardless of the instruction of the system controller 31, the transistor 60*b* is turned off, the potential of the collector becomes high and the transistor 64 can be maintained in an off state.

As described above, regardless of the abnormal instruction from the system controller 31, the spindle motor 18, the sled motor 20 and the light emitting control circuit 39 will not be driven by installing the safety circuit 40, so that the solenoid 28*b* can be turned off by installing the safety circuit 60. However, the structure of individually installing the safety circuit 40 and the protection circuit 60 becomes complicated and obstructs the miniaturization of the whole device.

SUMMARY OF THE INVENTION

According to the foregoing description, an object of this invention is to provide device capable of maintaining a non-driven state of a spindle motor or a lock mechanism by using a simple circuit even though the system is abnormal.

According to the at least objects mentioned above, the present invention provides a recording medium driving apparatus, comprising a rotation driving means for rotably driving a recording medium; a recording/reproducing means for recording/reproducing data to/from the recording medium; a transmission driving means for relatively driving the recording/reproducing means with respect to the recording medium; a tray means for carrying the rotation driving means, the recording/reproducing means and the transmission driving means, and capable of inserting to and ejecting from a casing; a lock means, having an electromagnetic driving means, wherein under an insertion state of the tray means, the tray means is engaged with the casing and the tray means is maintained at a non-ejectable state, and when the electromagnetic driving means is in a driving state, the tray means is disengaged with the casing and the tray means becomes ejectable; an eject means, for moving the tray means from an insertion position to an eject position by releasing an engagement between the tray means and the casing; a controller, for selectively outputting operation instructions and non-operation instructions to the rotation driving means, transmission driving means and the electromagnetic driving means respectively; a detection means for detecting an eject state of the tray means; a first disable circuit for disabling an operation of the electromagnetic driving means regardless of instructions from the controller, according to a detection signal from the detection means; and a second disable circuit for disabling operations of the rotation driving means and the transmission driving means regardless of the instructions from the controller, according to the detection signal from the detection means. The first and the second disable circuits comprise a single mute signal generator for outputting a mute signal according to the detection signal from the detection means, so as to disable the operations of the rotation driving means and the transmission driving means.

In the above invention, the first disable circuit (protection circuit) and the second disable circuit (safety circuit) are integrated by using the single mute signal generator, rather than individually constructed like the conventional art, so that the structure is simplified and the part numbers are reduced. In addition, by carrying the electromagnetic driving means on the tray means together with the rotation driving means and the transmission driving means, the first and the second disable circuits can be integrated by using the single mute signal generator. In addition, the driver for driving the electromagnetic driving means and the drivers for respectively driving the rotation driving means and the transmission driving means can be easily integrated as a single IC. In one embodiment of the present invention, the drivers for respectively driving the rotation driving means, the transmission driving means and the electromagnetic driving means are integrated into the IC, and the single mute signal generator is assembled into the integrated IC. Therefore, all operations of the drivers can be controlled by the mute signal from the mute signal generator.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the following accompanying drawings.

DESCRIPTION OF THE PREFERRED EMBODIMENT

Figure 3:
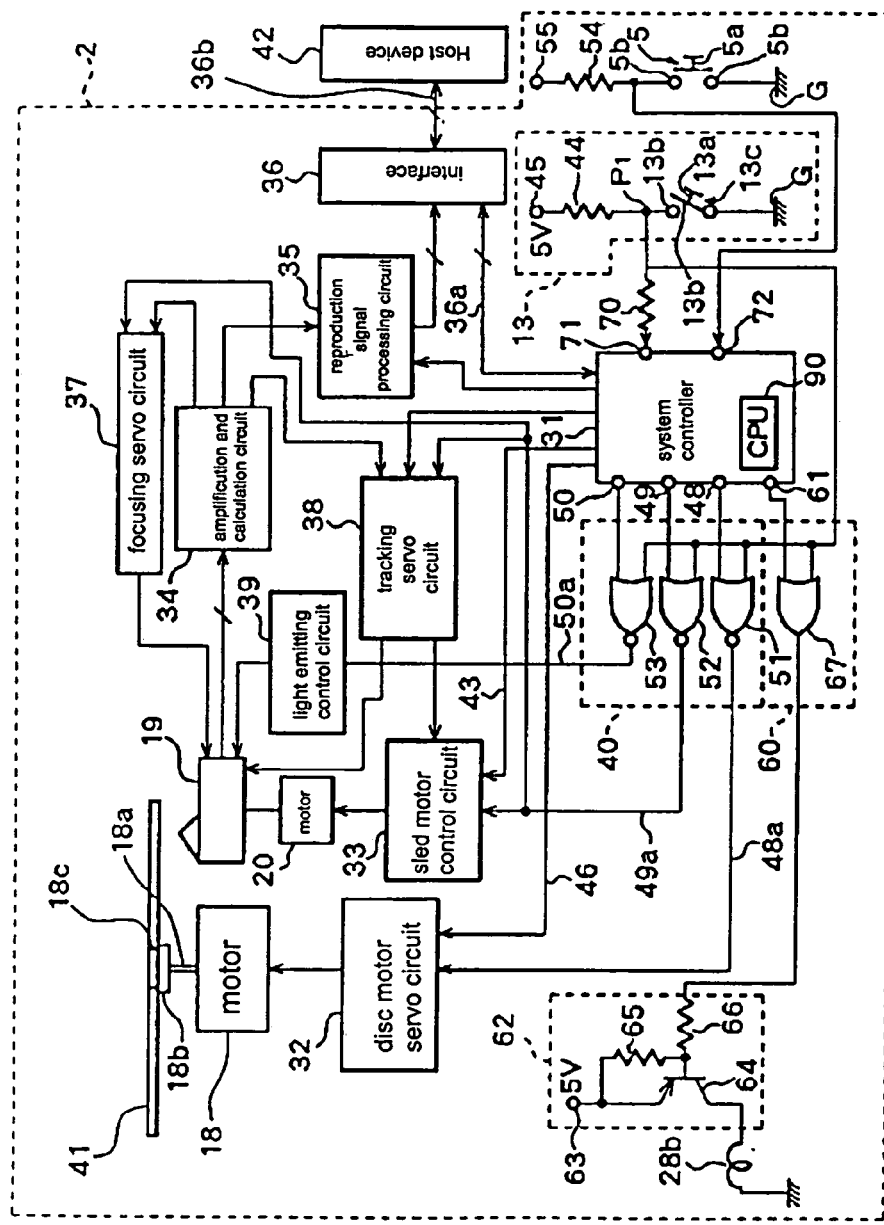
FIG. 3 is an entire block diagram of a conventional device.
Figure 4:
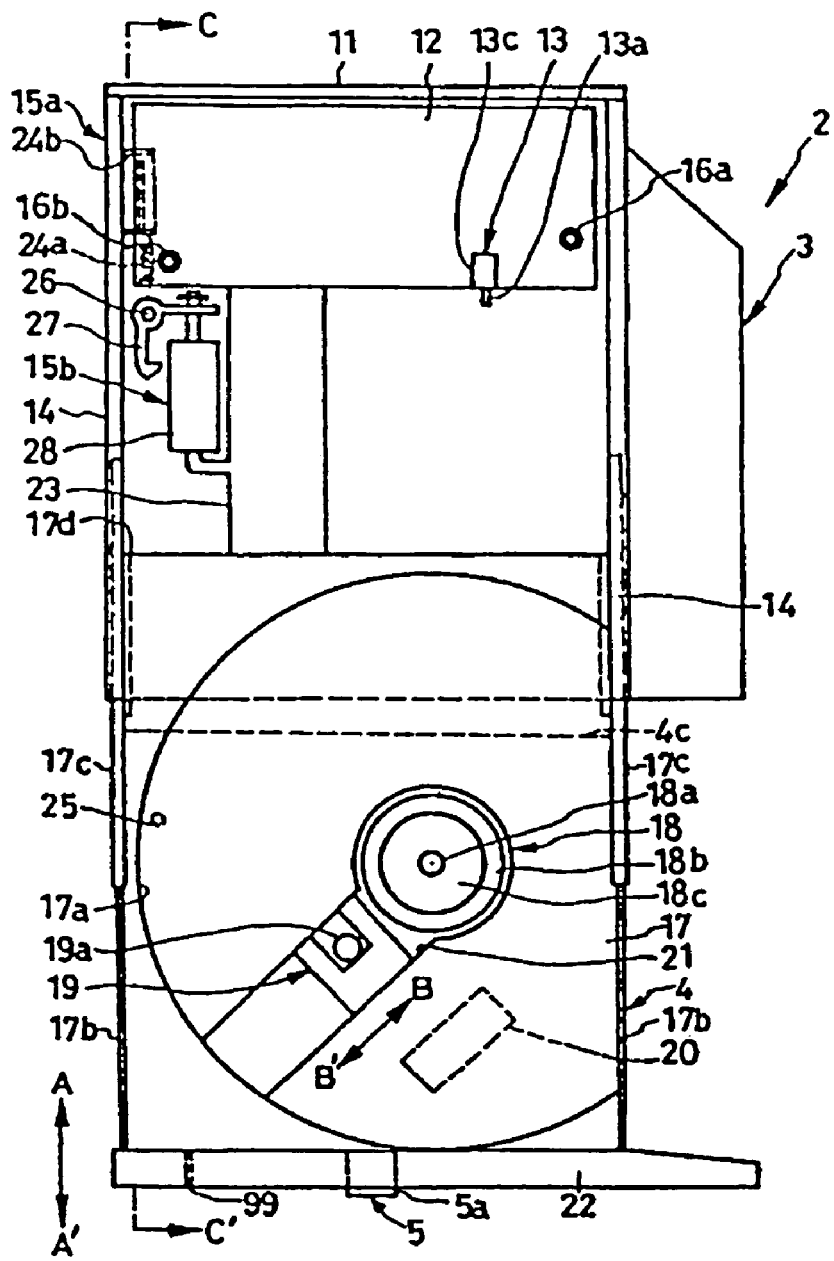
FIG. 4 is a plane view showing a state that the cover of the conventional device is removed.
Figure 5:
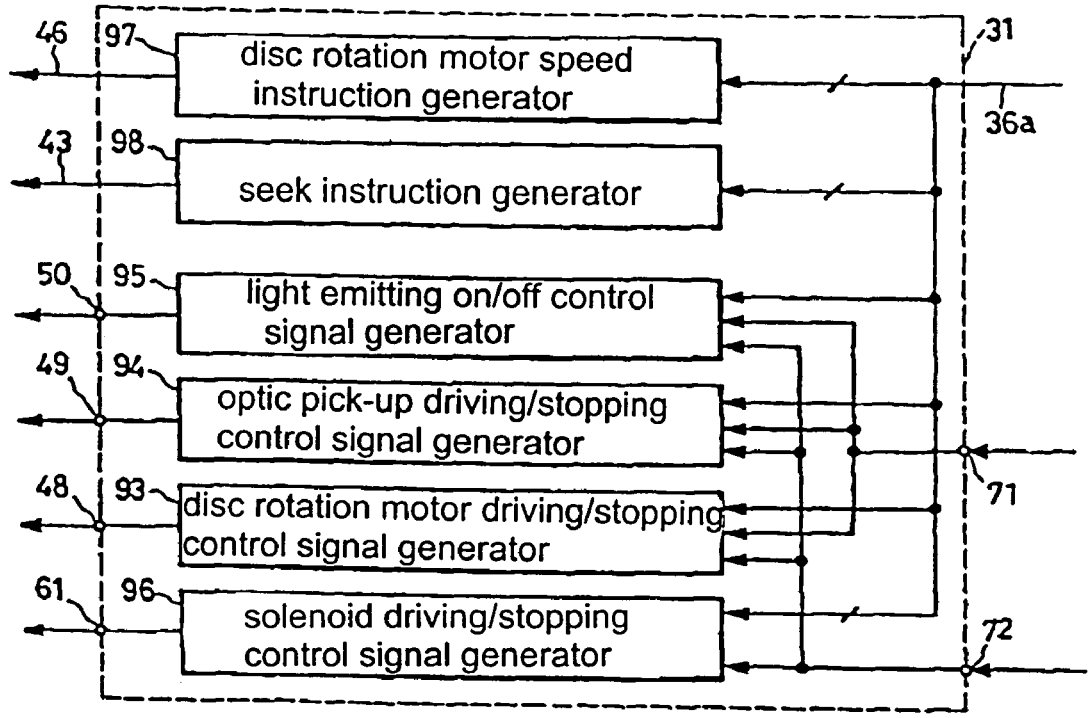
FIG. 5 is an equivalent block diagram of FIG. 3.
Figure 6:
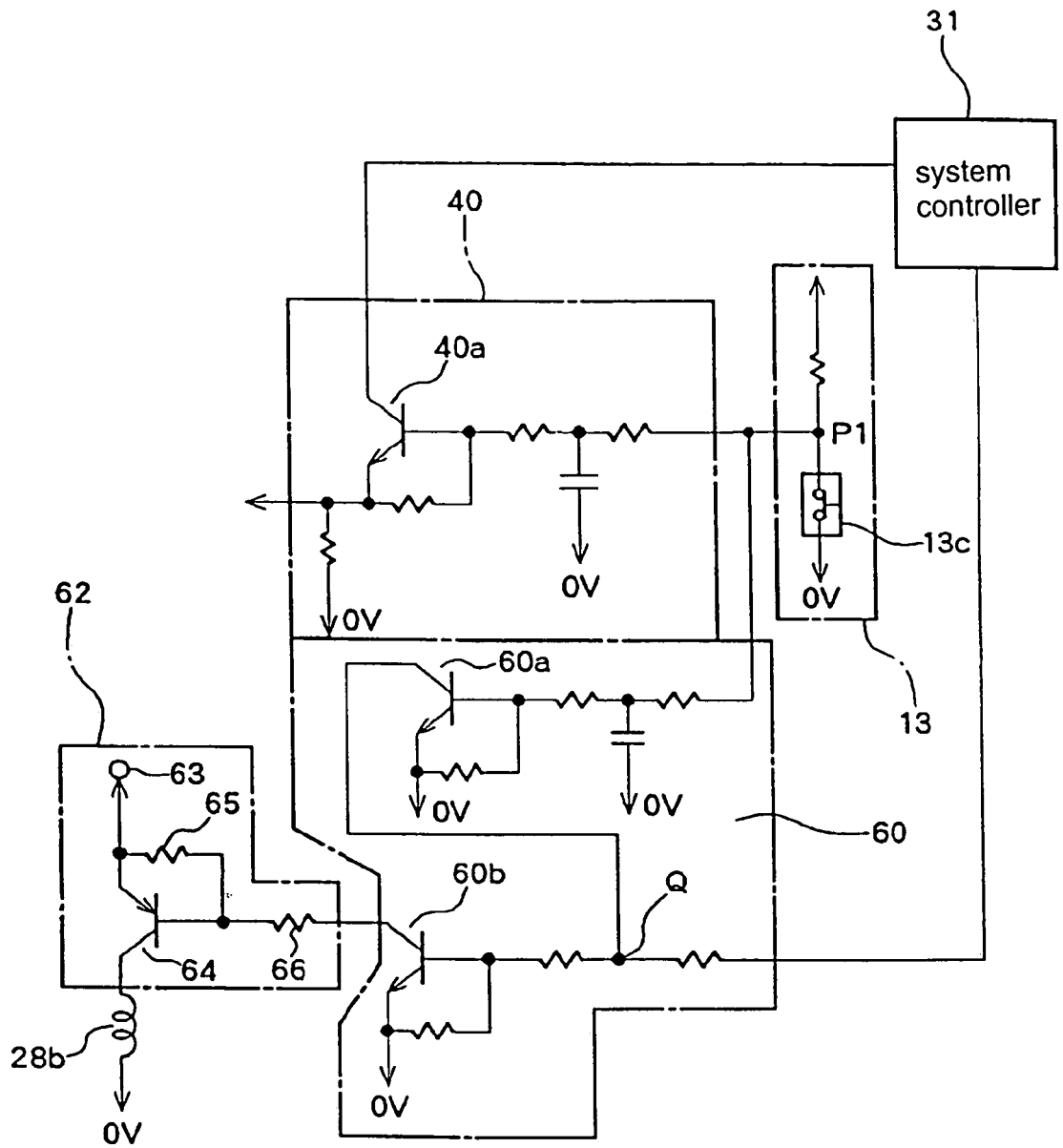
FIG. 6 is a circuit diagram of a safety circuit and a protection circuit of the conventional device.
Figure 7:
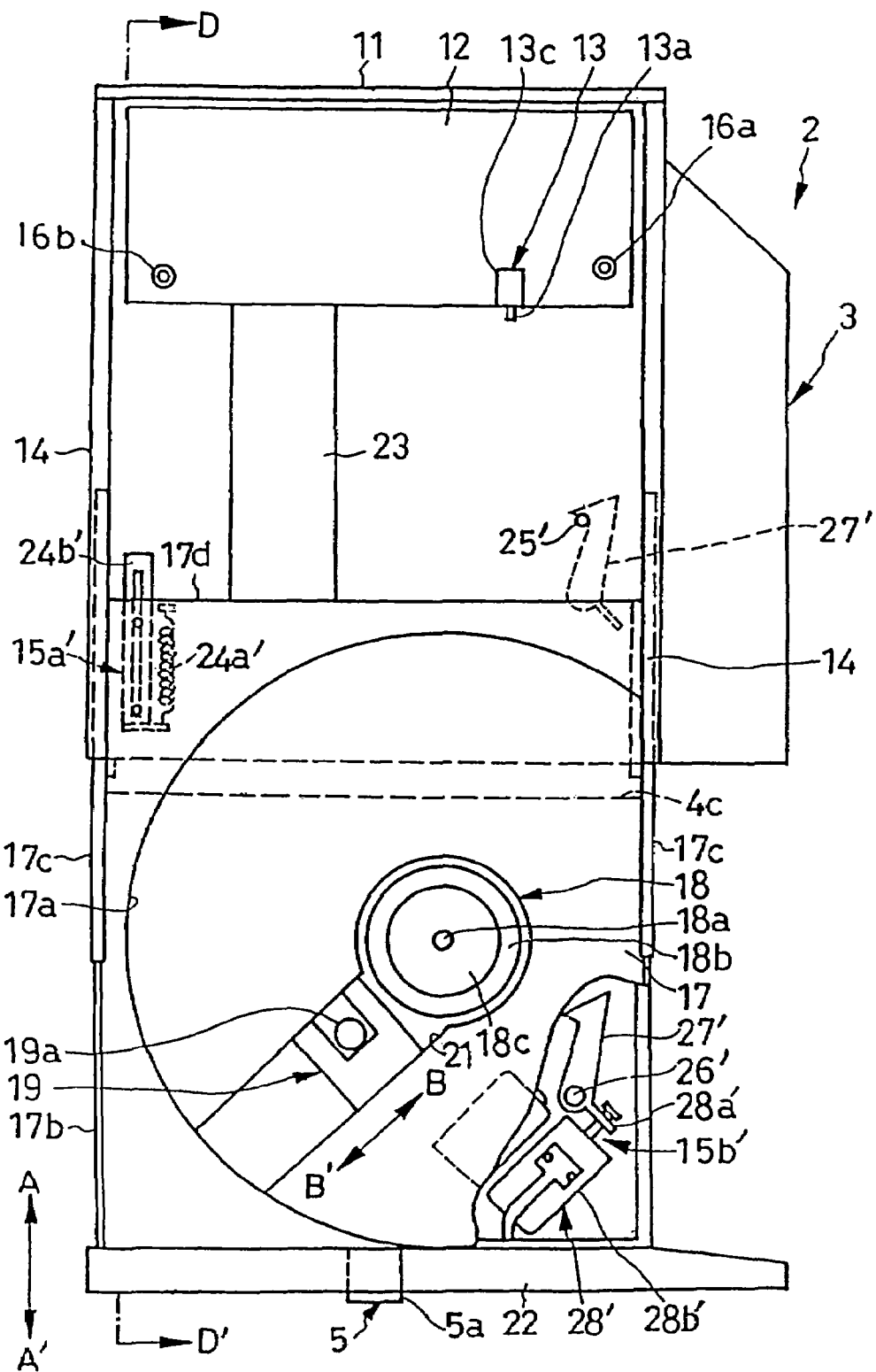
FIG. 7 is a plane view showing a state that the cover of the device is removed according to the embodiment of the present invention.

The embodiment of the present invention is explicated by using a CD-ROM drive as an example according to attached drawings. Except for the safety circuit 40 and the protection circuit 60, the entire structure of the CD-ROM drive is the same as that shown in FIG. 3, and their corresponding descriptions are skipped. FIG. 7 is a plane view showing a state that the cover of the device is removed according to the embodiment of the present invention. Except for that the eject mechanism 15*a*' and the lock and lock-releasing mechanism 15*b*' are arranged on the tray 17, the other structural parts are the same as those shown in FIG. 4.

Figure 1:
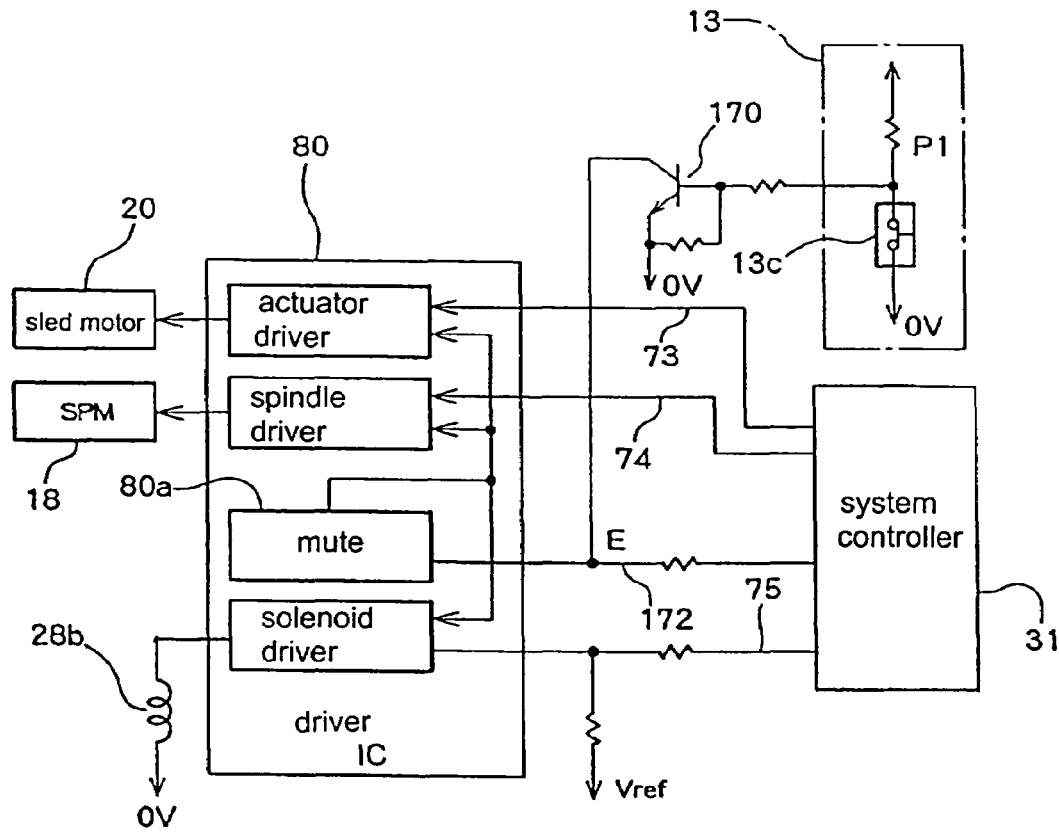
FIG. 1 shows a block diagram according to the embodiment of the present invention.

FIG. 1, shows a structure of a safety circuit and a protection circuit according to the present invention. In the embodiment, an actuator driver for driving the sled motor 20 (the sled motor control circuit 33), a spindle motor driver for driving the spindle motor 18 (the disc motor servo circuit 32) and a solenoid driver for driving the solenoid 28*b* (the solenoid control circuit 62) are integrated into a driver IC 80. Namely, the conventional solenoid control circuit 62, which is constructed by an external part, is integrally assembled into the IC 80 together with the sled motor driver circuit and the spindle motor driver circuit. Therefore, the safety circuit for setting the sled motor 20 and the spindle motor 18 in a non-driven state and the protection circuit for setting the solenoid 28b in a non-driven state regardless of the abnormal instruction from the system controller 31 are integrated.

The safety circuit of the embodiment comprises a transistor 170, a bus 172 and a mute signal generator 80a. The base of the transistor 170 is connected to the connection point P1 of the tray position sensor 13, the emitter is connected to the 0V voltage and the collector is connected to a connection point E of the bus 172. The bus 172 is used to couple the mute signal generator 80a and the system controller 31, and is used to provide a mute signal (LOW) according to an eject operation from the system controller 31.

In addition, the protection of the embodiment also comprises the transistor 170, the bus 172 and the mute signal generator 80a.

The mute signal generator 80a is integrated into the driver IC 80, and a mute signal (LOW) from the system controller 31 is input through the bus 172. The mute signal (LOW) is provided to the actuator driver, the spindle driver and the solenoid driver that are also integrated into the driver IC 80.

Control signals from the system controller 31 are respectively input to the actuator driver, the spindle driver and the solenoid driver in the driver IC 80. Namely, the bus 73 connects the system controller 31 and the actuator driver, the bus 74 connects the system controller and the spindle driver, and the bus 75 connects the system controller 31 and the solenoid driver. The system controller 31 uses the buses 73, 74, 75 to output driving instructions. In addition, the mute signal from the mute signal generator 80a is also input to the actuator driver, the spindle driver and the solenoid driver. When the mute signal is "mute", i.e., low, each loading (of the actuator driver, the spindle driver and the solenoid driver) is set to a non-driven state regardless of the control signals.

The detail operation according to the embodiment is further described as follows.

System Controller is Normal

When the system controller 31 is normal, driving instructions (HIGH) are output through the buses 73, 74, 75 under an insertion condition of the tray 17. The sled motor 20, the spindle motor 18 and the solenoid 28b are driven. Under the insertion state of the tray, a lock lever 27' rotably supported by an axis 26' of the tray 17 is engaged with a lock protrusion 25' formed on the casing 11. The tray 17 is locked by the casing 11 and the solenoid 28b is subjected to an unmovable state. At this time, since the switch 13c of the tray position sensor 13 is turned on, the potential at the connection point P1 is low. The transistor 170 is then turned off, and the potential of the connection point E connected to the collector of the transistor 170 becomes high (HIGH). When the system controller 31 is normal, a non-mute signal (HIGH) is output on the bus 172 under an insertion state of the tray 17, and the bus 172 is maintained at HIGH combined with the off state of the transistor 170. Since the potential of the connect point E is high (HIGH), the mute signal generator 80a in the driver IC 80 outputs the non-mute signal (HIGH) to the actuator driver, the spindle driver and the solenoid driver. Therefore, each driver drives its loading according to the driving instruction from the system controller 31.

When the disc is to be ejected, the mute signal (LOW) is output to the bus 172 from the normal system controller 31. Therefore, the mute signal generator 80a outputs the mute signal to each driver, and then each driver sets its corresponding loading to the non-driven state according to the mute signal.

System Controller is Abnormal

On the other hand, a situation is assumed that any abnormality of the system controller 31 occurs, and even in the eject state the mute signal is not output from the bus 172 and the driving signal (HIGH) of the solenoid 28b is output from the bus 75. In this case, since the switch 13c of the tray position sensor 13 becomes off state, the connection point P1 becomes HIGH and the transistor is turned on, so that the collector, i.e., the connection point E becomes LOW regardless of the non-mute signal (HIGH) from the system controller 31. Therefore, the mute signal generator 80a, which inputs the signal through the bus 172, outputs the mute signal to each driver, so that the sled motor 20 and the spindle motor 18 can be also maintained at the non-driven state when the system controller 31 is abnormal. Furthermore, since the mute signal is also output to the solenoid driver, even though the driving instruction is abnormally output from the system controller 31 through the bus 75, the solenoid 28b is maintained in the non-driven state according to the mute signal.

In the embodiment, the safety circuit and the protection circuit have the common circuit structure, and at the eject state the non-driven state is maintained by the signal from the tray position sensor 13 and the mute signal from the mute signal generator 80a.

Figure 2:
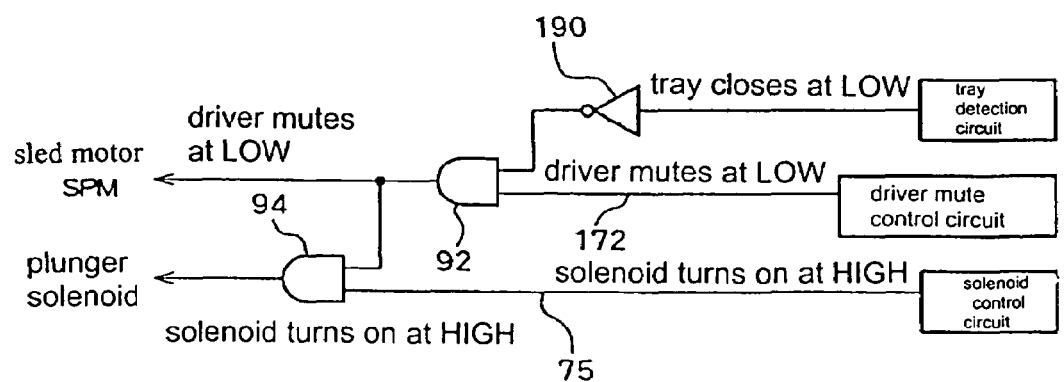
FIG. 2 shows an equivalent logic circuit diagram of FIG. 1.

FIG. 2 illustrates an equivalent logic circuit of the safety circuit and the protection circuit according to the embodiment. A NOT gate 190, an AND gate 92 and an AND gate 94 correspond respectively to the transistor 170, the mute signal generator 80a and the solenoid driver. When the system controller 31 is normal, since the LOW signal (mute) is output and input to the AND gate 92 at the eject state, the LOW signal is output from the AND gate 92 and therefore, the sled motor 20 and the spindle motor 18 are subjected to the non-driven state. In addition, since the output from the AND gate 92 is also input to the AND gate 94, the output of the AND gate 94 also becomes LOW and the solenoid 28b will be subjected to the non-driven state.

When the system controller 31 is abnormal, HIGH is continuously output at the eject state and then is input to the AND gate 92. However, HIGH is output from the tray position sensor 13 (as the tray detection circuit), and then inverted by the NOT gate 190, so that LOW is input to another input end of the AND gate 92. Therefore, similar to the normal operation, the output from the AND gate 92 becomes LOW, the sled motor 20 and the spindle motor 18 are subjected to non-driven state. In addition, since the signal on the bus 75 is controlled by the AND gate 94 by using the output from the AND gate 92, even though the bus 75 outputs HIGH, the output from the AND gate 94 becomes LOW and the solenoid 28b can be also maintained at the non-driven state.

According to the embodiment described above, in order to force the sled motor 20 and the spindle motor 18 at the non-driven state under the eject state, a single (common) mute signal generator 80a is arranged in the driver IC 80. By using the mute signal from the mute signal generator 80a, the solenoid 28b locking the tray 13 is at the non-driven state under the eject state, and therefore, the circuit structure can be simplified and part numbers can be reduced.

In addition, in the embodiment, the sled motor 20 and the spindle motor 18 are forced at the non-driven state under the eject state. However, similar to the conventional art, the mute signal from the mute signal generator 80a can be output to the light emitting control circuit for the LED to disable the LED to emit light.

As described above, according to the present invention, even though the system is abnormal, the spindle motor and the lock mechanism, etc. can be maintained at the non-driven state by using a simple circuit structure.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A recording medium driving apparatus, comprising:
   a rotation driving means for rotably driving a recording medium;
   a recording/reproducing means for recording/reproducing data to/from the recording medium;
   a transmission driving means for relatively driving the recording/reproducing means with respect to the recording medium;
   a tray means for carrying the rotation driving means, the recording/reproducing means and the transmission driving means, and capable of inserting to and ejecting from a casing;
   a lock means, having an electromagnetic driving means, wherein under an insertion state of the tray means, the tray means is engaged with the casing and the tray means is maintained at a non-ejectable state, and when the electromagnetic driving means is in a driving state, the tray means is disengaged with the casing and the tray means becomes ejectable;
   an eject means, for moving the tray means from an insertion position to an eject position by releasing an engagement between the tray means and the casing;
   a controller, for selectively outputting operation instructions and non-operation instructions to the rotation driving means, the transmission driving means and the electromagnetic driving means respectively;
   a detection means, for detecting an eject state of the tray means;
   a first disable circuit, for disabling an operation of the electromagnetic driving means regardless of instructions from the controller, according to a detection signal from the detection means; and
   a second disable circuit, for disabling operations of the rotation driving means and the transmission driving means regardless of the instructions from the controller, according to the detection signal from the detection means,
   wherein the first and the second disable circuits comprise a single mute signal generator for outputting a mute signal according to the detection signal from the detection means, so as to disable the operations of the rotation driving means and the transmission driving means.

2. The recording medium driving apparatus of claim 1, wherein the tray means carries the electromagnetic driving means.

3. The recording medium driving apparatus of claim 1, wherein drivers for respectively driving the electromagnetic driving means, the rotation driving means and the transmission driving means are integrated as a driver IC, and the single mute signal generator is integrated into the driver IC.

4. The recording medium driving apparatus of claim 2, wherein drivers for respectively driving the electromagnetic driving means, the rotation driving means and the transmission driving means are integrated as a driver IC, and the single mute signal generator is integrated into the driver IC.

* * * * *